(12) United States Patent
Abdala et al.

(10) Patent No.: US 11,736,582 B2
(45) Date of Patent: *Aug. 22, 2023

(54) MANAGING DATA TRANSMISSIONS BASED ON A USER'S DIGITAL FOOTPRINT

(71) Applicant: Lotame Solutions Inc., Columbia, MD (US)

(72) Inventors: Omar T. Abdala, Cambridge, MA (US); Hao D. Duong, Dunn Loring, VA (US)

(73) Assignee: Lotame Solutions Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,332

(22) Filed: Oct. 27, 2021

(65) Prior Publication Data

US 2022/0053061 A1 Feb. 17, 2022

Related U.S. Application Data

(63) Continuation of application No. 16/939,870, filed on Jul. 27, 2020, now Pat. No. 11,190,604, which is a
(Continued)

(51) Int. Cl.
*H04L 67/50* (2022.01)
*H04L 47/70* (2022.01)
(Continued)

(52) U.S. Cl.
CPC ............ *H04L 67/535* (2022.05); *G06N 3/08* (2013.01); *G06N 20/00* (2019.01); *H04L 41/16* (2013.01); *H04L 47/70* (2013.01)

(58) Field of Classification Search
CPC ....... H04L 67/535; H04L 41/16; H04L 47/70; G06N 3/08; G06N 20/00
See application file for complete search history.

(56) References Cited

U.S. PATENT DOCUMENTS 8,023,421 B2 * 9/2011 Lloyd .................. H04L 43/026
370/254
10,771,574 B2 9/2020 Abdala et al.
(Continued)

OTHER PUBLICATIONS

U.S. Appl. No. 16/178,982, Non-Final Office Action, dated Jan. 22, 2020, 16 pages.
(Continued)

*Primary Examiner* — Michael Won
(74) *Attorney, Agent, or Firm* — Kilpatrick Townsend & Stockton LLP

(57) ABSTRACT

One exemplary system can determine a digital footprint for a user. The system can determine a first transmission pattern in which first content was transmitted to a first user device based at least in part on the digital footprint. The system can determine training data that includes a relationship between (i) one or more characteristics of the first content and (ii) the first transmission pattern. The system can then train a machine-learning-model using the training data to enable the machine-learning-model to predict a second transmission pattern in which to transmit second content that is different from the first content. The system can provide the second content as input to the machine-learning-model to obtain the second transmission pattern as output from the machine-learning-model. The system can cause the second content to be transmitted to the first user device in accordance with the second transmission pattern, which may conserve computing resources.

22 Claims, 3 Drawing Sheets

Related U.S. Application Data continuation of application No. 16/178,982, filed on Nov. 2, 2018, now Pat. No. 10,771,574.

(60) Provisional application No. 62/581,488, filed on Nov. 3, 2017.

(51) Int. Cl.
  *G06N 20/00* (2019.01)
  *H04L 41/16* (2022.01)
  *G06N 3/08* (2023.01)

(56) References Cited

U.S. PATENT DOCUMENTS

| | | | |
|---|---|---|---|
| 10,924,513 B1* | 2/2021 | Sokolov | H04L 63/0245 |
| 10,985,821 B1* | 4/2021 | Somashekar | H04W 72/046 |
| 11,304,066 B1* | 4/2022 | Parihar | H04B 7/0695 |
| 2002/0150044 A1 | 10/2002 | Wu et al. | |
| 2005/0203765 A1 | 9/2005 | Maritzen et al. | |
| 2005/0289058 A1 | 12/2005 | Hoffman et al. | |
| 2006/0268825 A1 | 11/2006 | Westerberg | |
| 2011/0207489 A1 | 8/2011 | Deluca | |
| 2011/0213869 A1 | 9/2011 | Korsunsky et al. | |
| 2013/0107727 A1 | 5/2013 | Lunden et al. | |
| 2013/0110978 A1 | 5/2013 | Gordon et al. | |
| 2014/0380466 A1* | 12/2014 | Schultz | H04L 63/1408 726/22 |
| 2015/0163311 A1 | 6/2015 | Heath et al. | |
| 2016/0006730 A1 | 1/2016 | Chari et al. | |
| 2017/0232300 A1 | 8/2017 | Tran et al. | |
| 2018/0204128 A1* | 7/2018 | Avrahami | G06Q 10/109 |
| 2018/0213033 A1* | 7/2018 | Subbian | H04L 67/306 |
| 2018/0247241 A1* | 8/2018 | Avrahami | G06Q 10/06316 |
| 2020/0104457 A1 | 4/2020 | Chuang et al. | |
| 2020/0134420 A1 | 4/2020 | Spooner | |
| 2020/0228452 A1* | 7/2020 | Boss | H04L 47/24 |
| 2020/0382568 A1 | 12/2020 | Krochmal et al. | |
| 2021/0097133 A1* | 4/2021 | Liao | G06F 40/30 |
| 2021/0365806 A1* | 11/2021 | Sumanth | G06N 20/20 |

OTHER PUBLICATIONS

U.S. Appl. No. 16/178,982, Notice of Allowance, dated Apr. 4, 2020, 8 pages.
U.S. Appl. No. 16/939,870, Notice of Allowance, dated Jul. 28, 2021, 10 pages.

* cited by examiner

MANAGING DATA TRANSMISSIONS BASED ON A USER'S DIGITAL FOOTPRINT

CROSS REFERENCE TO RELATED APPLICATIONS

This application is a continuation of U.S. application Ser. No. 16/939,870, filed Jul. 27, 2020, which is a continuation of U.S. application Ser. No. 16/178,982, filed Nov. 2, 2018, which claims the benefit of priority under 35 U.S.C. § 119(e) to U.S. Provisional Patent Application No. 62/581,488, filed Nov. 3, 2017, the entirety of all of which are hereby incorporated by reference herein.

FIELD OF THE INVENTION

The present disclosure relates generally to managing data transmissions. More specifically, but not by way of limitation, this disclosure relates to managing data transmissions based on a user's digital footprint.

BACKGROUND

Internet-connected devices allow users to engage in various Internet activities. As a user engages in such activities, the user can leave behind a digital footprint. A digital footprint includes data that represents the user's Internet activities, such as the user's interaction with digital content (e.g., websites, webpages, applications, etc.). Typically, digital footprints only include information resulting from a user performing Internet activities using a home computer or mobile phone. But with the advent of the "Internet of Things" (IoT) and smart devices, digital footprints have been expanded to include additional information from other household items, such as smart televisions.

SUMMARY

One example of the present disclosure includes a system that includes a processing device and a memory device that includes instructions executable by the processing device. The instructions can cause the processing device to determine a digital footprint corresponding to a user, wherein the digital footprint indicates Internet activities performed by the user with a first user device and a second user device during a time period. The instructions can cause the processing device to determine, based at least in part on the digital footprint, a first transmission pattern in which first content was transmitted to the first user device during the time period, wherein the first transmission pattern resulted in the second user device performing an Internet activity corresponding to the first content. The instructions can cause the processing device to generate training data that includes a relationship between (i) one or more characteristics of the first content and (ii) the first transmission pattern. The instructions can cause the processing device to train a machine-learning-model using the training data to enable the machine-learning-model to predict a second transmission pattern in which to transmit second content that is different from the first content. The instructions can cause the processing device to provide the second content as input to the machine-learning-model to obtain the second transmission pattern as output from the machine-learning-model. The instructions can cause the processing device to cause the second content to be transmitted to the first user device in accordance with the second transmission pattern.

Another example of the present disclosure includes a method that includes determining a digital footprint corresponding to a user, wherein the digital footprint indicates Internet activities performed by the user with a first user device and a second user device during a time period. The method can also include determining, based at least in part on the digital footprint, a first transmission pattern in which first content was transmitted to the first user device during the time period, wherein the first transmission pattern resulted in the second user device performing an Internet activity corresponding to the first content. The method can also include generating training data that includes a relationship between (i) one or more characteristics of the first content and (ii) the first transmission pattern. The method can also include training a machine-learning-model using the training data to enable the machine-learning-model to predict a second transmission pattern in which to transmit second content that is different from the first content. The method can also include providing the second content as input to the machine-learning-model to obtain the second transmission pattern as output from the machine-learning-model. The method can also include causing the second content to be transmitted to the first user device in accordance with the second transmission pattern. Some or all of these operations can be implemented by a processing device.

Yet another example of the present disclosure includes a non-transitory computer-readable medium comprising program code that is executable by a processing device for causing the processing device to implement the method discussed above.

These illustrative examples are mentioned not to limit or define the limits of the present subject matter, but to aid understanding thereof. Illustrative examples are discussed in the Detailed Description, and further description is provided there. Advantages offered by various examples may be further understood by examining this specification and/or by practicing one or more examples of the claimed subject matter

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
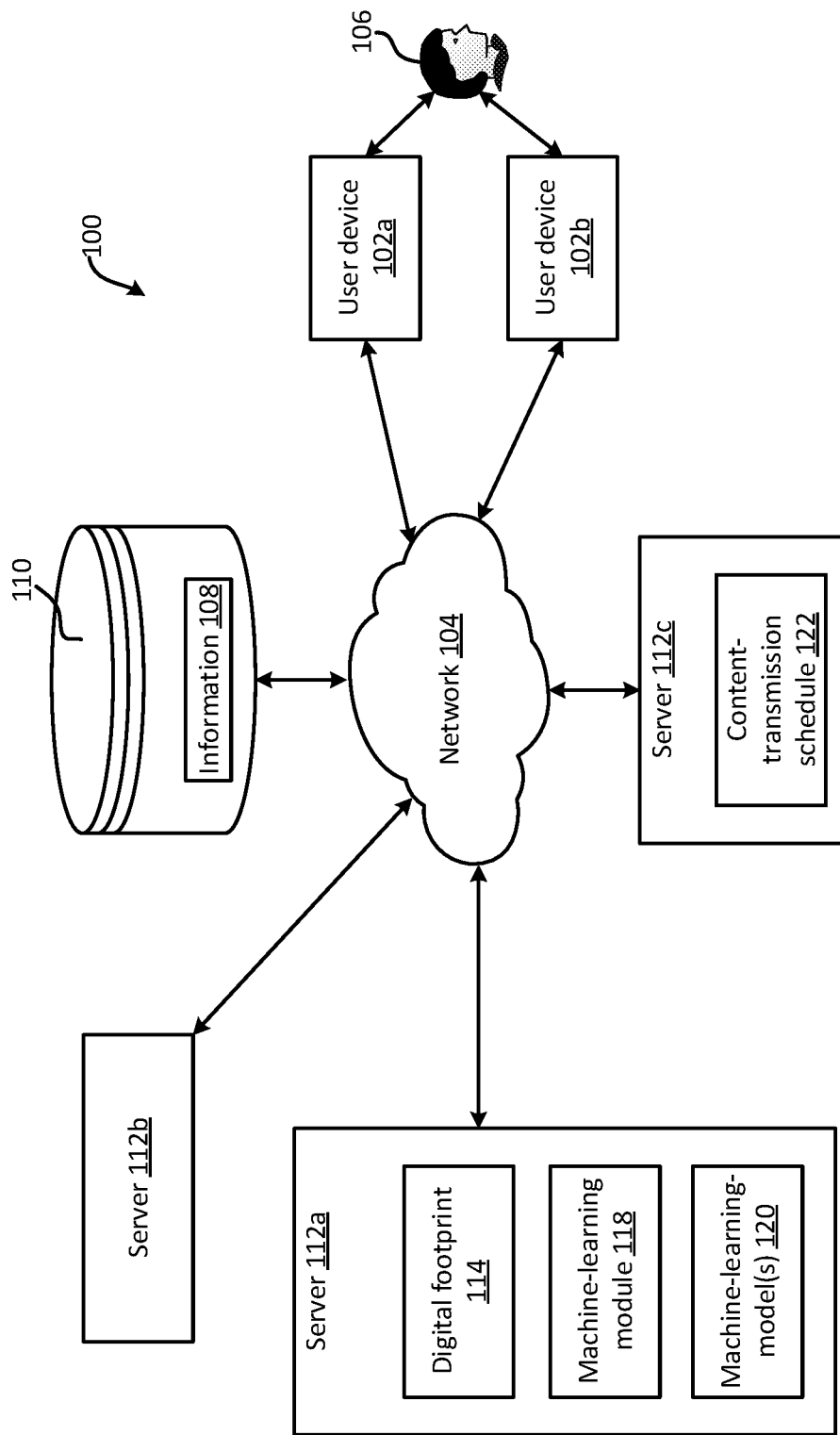
FIG. 1 is a block diagram of an example of a system for managing data transmissions based on a user's digital footprint according to some aspects.

Most users have several devices through which they perform activities on the Internet. Each of these Internet activities typically involves the user's devices communicating with servers. But these servers typically have no data/information indicating that all of the devices belong to the same user, since the servers do not have a holistic view of all of the user's Internet activities across all of the user's devices. As a result, it is common for the servers to transmit the same data to some or all of the user's devices, such that the user repeatedly sees the same data. For example, a server may repeatedly and unnecessarily transmit the same data to a user's cellular phone, smart television, and laptop, unaware that all of these devices belong to the same user.

Additionally, because these servers typically have no data/information indicating that all of the devices belong to the same user, it may be difficult for these servers to determine what combination of data transmissions ultimately led to the user performing a desired Internet activity. For example, it is challenging to determine how many times, at what frequency, and to which of the user's devices a server transmitted a digital file before the user actually clicked on a link in the digital file. As a result, these servers are incapable of learning the most optimal ways in which to transmit data to the user's devices so as to elicit a desired response while limiting consumption of computing resources. In the end, the servers typically transmit the same data to the user's devices far more times than is actually required to elicit a desired response, which may waste valuable computing-resources (e.g., network bandwidth, processing power, and memory) in the process.

Some examples of the present disclosure can overcome one or more of the abovementioned problems by using a user's digital footprint to determine an optimal transmission pattern at which to transmit data to the user. For example, a server can receive data from multiple sources about the user's Internet activities in order to develop a digital footprint for the user. The server can then analyze the digital footprint to identify a pattern in which data was transmitted to the user before the user ultimately took a desired action in relation to the data. For example, the server can analyze the digital footprint to determine that a digital file was transmitted to the user's devices three times on a particular combination of days before the user finally clicked a link in the digital file. The pattern of how many times, at what frequency, and/or to what device(s) the data was transmitted before the user ultimately took a desired action in response to the data is referred to herein as an effective transmission pattern. The server can use the effective transmission pattern to determine how to transmit other, similar datasets to the user's devices in the future in order to achieve a desired result. The server can use these insights to optimize transmission of similar datasets to the user's devices in the future (e.g., rather than transmitting the datasets indiscriminately). This may prevent the unnecessary consumption of computing resources.

Reference will now be made in detail to various and alternative illustrative examples and to the accompanying drawings. Each example is provided by way of explanation and not as a limitation. It will be apparent to those skilled in the art that modifications and variations can be made. For instance, features illustrated or described as part of one example may be used in another example to yield a still further example. Thus, it is intended that this disclosure include modifications and variations as come within the scope of the appended claims and their equivalents.

Illustrative Example of Managing Computing Resources Based on a User's Digital Footprint In one illustrative example, a user may be watching a smart television, during which content about an upgrade to the smart television's firmware is shown. After viewing the content, the user can access a website related to the content with one of the user's other devices, such as the user's smartphone. The website might contain, for example, a list of security risks mitigated by the upgrade and other related information. Streaming of the content to the user's smart television and the user's subsequent accessing of the website constitute Internet activities that can form parts of the user's digital footprint.

In the illustrative example, a system can analyze data generated by the user's smart television and other data generated by the user's smartphone to determine that the two devices belong to the same user. For example, the system can determine that both devices were used to login to the same website accounts (e.g., social media accounts, e-mail accounts, etc.) and therefore that both devices likely belong to the same user. As another example, the server can determine that both devices have accessed the Internet using the same IP address and therefore that both devices likely belong to the same user. The system can iterate this process for some or all of the user's devices to create a comprehensive digital footprint for the user.

Having linked data from the user's various devices to create a digital footprint for the user, the system then determines an effective transmission pattern for the content. For example, the system can determine that the content was transmitted to the smart television at 3:47 PM on a Tuesday. The system can also determine that the website related to the content was accessed by the user's smartphone (as indicated in the user's digital footprint) at 3:48 PM the same day. Since the website was accessed immediately after the content was transmitted to the smart television, the system can determine that transmitting the content at least one time, around 3:45 PM, on a Tuesday, constitutes an effective transmission pattern for the content. While this is a relatively simple example of a transmission pattern for ease of explanation, other examples can involve the server determining more complex transmission-patterns from larger amounts of information derived over significantly longer time periods and associated with a combination of devices in the user's digital footprint.

In the illustrative example, the system iterates the above process by transmitting various other communications (e.g., other content) to the user's smart television and analyzing the user's subsequent Internet activity in order to determine effective transmission patterns for some or all of the communications. If the various communications are sufficiently similar, the system can then use these effective transmission patterns as training data in order to train a machine-learning-model to predict an effective transmission pattern for a new communication not yet transmitted to the user. The system can determine if communications are sufficiently similar by analyzing one or more attributes of the communications for a preset combination of common characteristics, such as type, length, or keywords.

Additionally, the system may iterate the above process for other users in order to generate digital footprints for those users. The system can then use those digital footprints to determine effective transmission patterns related to those users. The system can then use those effective transmission patterns to train the machine-learning-model, if the system determines that the other users are similar enough to the target user. This can increase the machine-learning-model's accuracy by providing an increased amount training data. The system can determine if the other users are similar enough to the target user by comparing known information about (e.g., TV shows viewed) the users obtained from their digital footprints.

In the illustrative embodiment, the system uses the trained machine-learning-model to predict an effective transmission pattern for a new communication. The system then uses the prediction to optimize delivery of the new communication to the user's devices. For example, the system can automatically interact with a server to update how many times and at what frequencies they transmit the new communication to the user's devices, in order to optimize transmission of the new communication. This may prevent the unnecessary consumption of the server's computing resources.

The above description is provided merely as an example. Various other examples are described herein and variations of such examples would be understood by one of skill in the art. Advantages offered by various examples may be further understood by examining this specification and/or by practicing one or more examples of the claimed subject matter.

Illustrative Systems for Managing Computing Resources Based on a User's Digital Footprint FIG. 1 is a block diagram of an example of a system 100 for managing data transmissions based on a user's digital footprint according to some aspects. The system 100 includes user devices 102a-b communicatively coupled to a network 104, such as the Internet. Examples of the user devices 102a-b include the "Internet of Things" (IoT) devices and smart devices, such as smart televisions, smartphones, and wearable devices (e.g., smart watches or smart glasses). Other examples of the user devices 102a-b can include personal digital assistants, tablets, laptop computers, desktop computers, or any combination of these. A user 106 can manipulate the user devices 102a-b to perform Internet activities, such as visiting a website, downloading software, streaming content, or uploading software.

The user devices 102a-b can interact with one or more servers 112a-c (e.g., content servers) to perform the Internet activities. As the user devices 102a-b interact with the servers 112a-c, the servers 112a-c capture information 108 about the Internet activities and store the information 108 in one or more databases, collectively represented as database 110 in FIG. 1. For example, as the user surfs the web, views streaming content, and downloads software, the servers 112a-c may store information 108 related to those Internet activities in the database 110.

At least one of the servers 112a-c can access the database 110 and use the information 108 generate a digital footprint 114 for the user 106, whereby the digital footprint 114 represents the Internet activities performed by the user 106 via any number and combination of user devices. For example, the server 112a can begin the process of generating the digital footprint by analyzing a data trail generated by a user device 102a known to be associated with the user 106. The data trail may or may not be part of the information 108 stored in the database 110. The server 112a analyzes the data trail for markers that uniquely identify the user 106. Examples of the markers can include online accounts (e.g., social media, bank, and/or e-mail accounts), a geolocation corresponding to the user 106, an IP address corresponding to the user 106, or any combination of these. Next, the server 112 analyzes the information 108 in the database 110 for the markers to determine some or all of the Internet activities attributable to the user 106, and forms the user's digital footprint therefrom.

In one particular example, the user device 102a is a smart television to which content is streamed from a server 112c. Examples of the content can include ads. As the content is streamed to the smart television, the server 112c can store information 108 associated with the content to the database 110. For example, the server 112c can store information about the user's viewing habits in relation to the content—e.g., whether the user 106 viewed the content or did not view the content (e.g., switched channels to avoid viewing the content). The server 112c can also store other information related to the content, such as the network or channel on which the content was delivered, a type of the content, and one or more keywords describing the content. The server 112a can then access the database 110 and use some or all of this information 108 to form the user's digital footprint.

After obtaining (e.g., generating or receiving) the digital footprint 114, the server 112a analyzes the digital footprint 114 to determine relationships between the content transmitted to one or more user devices 102a-b and Internet activities performed by the user 106. This analysis may involve identifying commonalities between the content and the Internet activities. For example, the server 112a can determine that content transmitted to a user device 102a has certain keywords (e.g., brands and/or products) corresponding to a particular website visited by the user 106. As a result, the server 112a can determine that a relationship exists between the content and the website.

Having determined relationships the content transmitted to the user devices 102a-b and the user's Internet activities, the server 112a can then identify patterns in how the content was transmitted to the user devices 102a-b prior to (e.g., within a preset timeframe leading up to) the user engaging in corresponding Internet activities. Each pattern can constitute an effective transmission pattern for the corresponding content. For example, the server 112a can determine a pattern in which particular content was transmitted to a user device 102a during a one-week period leading up to the user 106 visiting a website corresponding to the particular content. This pattern can constitute an effective transmission pattern for the particular content, since the pattern likely caused the user 106 to visit the website. The effective transmission pattern can generally be specific to the user 106, or may also apply to other users in some instances.

The server 112a can use the effective transmission patterns for various pieces of content to create training data for one or more machine-learning-models 120. Examples of machine-learning-models 120 can include neural networks, support vector machines, and classifiers. To create the training data, the server 112 can use a machine-learning module 118 to analyze each piece of content in order to identify one or more characteristics (e.g., textual or image characteristics) of the piece of content. The server 112a can the generates training data having relationships between each piece of content's characteristics and its corresponding effective transmission pattern, from which the server 112a trains a machine-learning-model 120. In other examples, the server 112 creates multiple machine-learning-models 120. For example, the server 112 can use classifiers (e.g., Naïve bias classifiers) to classify content into various groups, whereby each content group has common characteristics. The server 112 then generates separate training data from each content group. The training data can include relationships between (i) the common characteristics defining a content group and (ii) the effective transmission patterns corresponding to the content in the content group. The server 112 can then use the training data for each content group to train separate machine-learning-models 120 tailored to the respective content groups.

In the above examples, the machine-learning-models 120 are trained using effective transmission patterns derived from the digital footprint 114 of the user 106. As a result, these machine-learning-models 120 are generally most effective at predicting transmission patterns for that specific user 106. But, in other examples, the machine-learning-models 120 can be trained using effective transmission patterns derived from other user's digital footprints. This may lead to machine-learning-models 120 that are more generally applicable to a variety of users.

After creating the machine-learning-models 120, the server 112*a* can use the machine-learning-models 120 to predict effective transmission patterns for known content or unknown content. Known content is content used to train the machine-learning-models 120, and unknown content is content that was not used to train the machine-learning-models 120. For example, the server 112*a* can receive a piece of unknown content to deliver to the user 106. The server 112*a* can input the unknown content into the machine-learning-model(s) 120 and receive as output from the machine-learning-model(s) 120 a prediction of an effective transmission pattern for the unknown content. The effective transmission pattern may include, for example, multiple transmissions of the unknown content to multiple user devices 102*a-b* associated with the user 106 over the course of multiple days.

To implement the effective transmission pattern for the new content, the server 112*a* can transmit data to one or more other servers 112*b-c*, whereby the data is configured to cause a content-transmission schedule 122 corresponding to the unknown content to be adjusted. The data can cause the content-transmission schedule 122 to be adjusted such that the server(s) 112*b-c* deliver the unknown content to one or more of the user device(s) 102*a-b* in accordance with the effective transmission pattern predicted by the machine-learning-model(s) 120. In some examples, the data includes commands, program code, or other instructions configured to cause the one or more other servers 112*b-c* to automatically adjust the content-transmission schedule 122 (e.g., to match the predicted effective-transmission pattern).

Optimizing transmission of unknown content in the above manner can conserve network bandwidth and prevent the servers 112*b-c* from wasting processing power and memory, for example, resulting from transmitting the unknown content too many times. This can also enable the servers 112*b-c* to better allocate their computing resources among processing tasks, for example, by preemptively knowing how much processing power and memory to allocate to delivering the unknown content to the user devices 102*a-b*, and thus how much remaining processing power and memory is free for other tasks.

In one particular example, the server 112*a* can analyze an unknown advertisement ("ad") to identify various characteristics of the ad. The server 112*a* can next input the characteristics into the machine-learning-model(s) 120 to receive as output a prediction of an effective transmission schedule for the unknown ad. The server 112*a* can then transmit commands to automatically cause the server 112*c* to adjust a content-transmission schedule 122 such that the server 112*c* delivers the unknown ad to one or more of the user device(s) 102*a-b* in accordance with the effective transmission pattern predicted by the machine-learning-model(s) 120. This can prevent the server 112*c* from wasting network bandwidth and other computing resources by transmitting the unknown ad in a suboptimal pattern. This can also enable the server 112*c* to preemptively allocate its computing resources, such that only the required among of computing resources are allocated to delivering the unknown ad to the user devices 102*a-b* and the remaining computing resources are free to perform other tasks.

Some of the above examples assume that the user's digital footprint 114 has sufficient information to derive effective transmission patterns and generate machine-learning-models 120. But, in some instances, the user's digital footprint may have insufficient information to perform these tasks. In those cases, the server 112*a* can analyze the user's digital footprint 114 and/or other sources of information to develop a profile describing attributes of the user 106. For example, the server 112 can analyze the user's digital footprint 114, census information, and data from the user's social media account to develop a comprehensive profile of the user 106 indicating 25 or more attributes of the user 106. For instance, the profile may indicate that the sex, age, marital status, number of children, job title, salary, hobbies, etc. The server 112*a* can repeat this process to create profiles for other users, too. The server 112*a* can then compare the profile for user 106 to other users' profiles to identify another user that is sufficiently similar to the user 106, and for whom there is a trained machine-learning-model. Since that machine-learning-model is likely also relevant to the user 106, the server 112*a* can use the machine-learning-model to determine an effective transmission pattern for content to be delivered to the user 106.

Although the exemplary system 100 of FIG. 1 is depicted as having a certain number and arrangement of components, other examples can involve other numbers and arrangements of the components. For example, while FIG. 1 depicts two user devices 112*a-b*, other examples can include any number and combination of user devices 112*a-b*. Likewise, while FIG. 1 depicts three servers 112*a-c*, other examples can include any number and combination of servers 112*a-c* performing any amount and combination of functionality described herein. And, while FIG. 1 illustrates the database 110 and the server 112 as being separate from one another, in other examples the server 112 may include the database 110.

Figure 2:
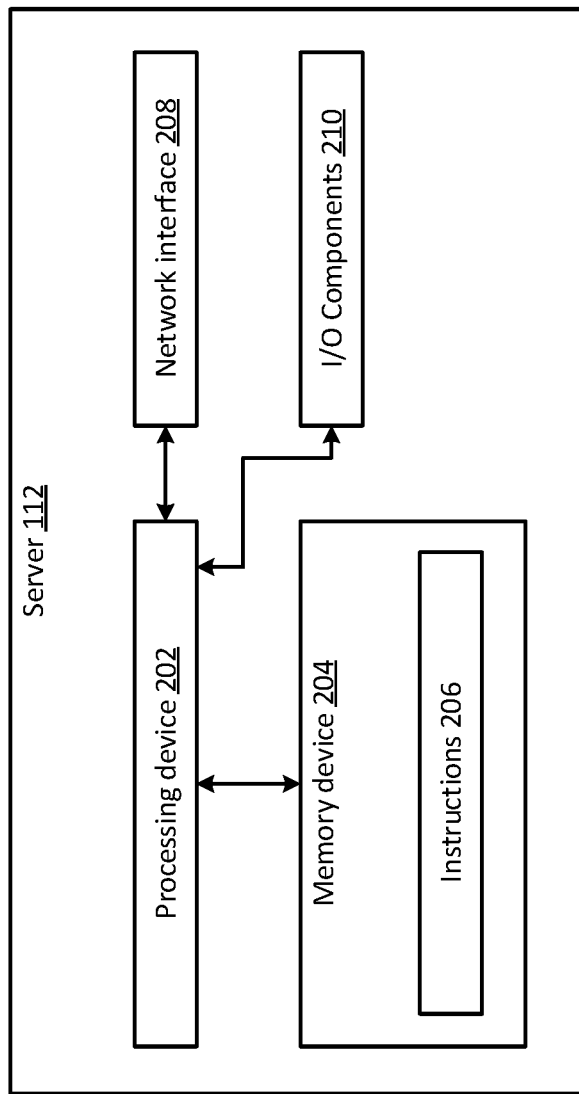
FIG. 2 is a block diagram of an example of a server for managing data transmissions based on a user's digital footprint according to some aspects.

FIG. 2 is a block diagram of an example of a server 112 for managing data transmissions based on a user's digital footprint 114 according to some aspects. The server 112 includes a processing device 202 communicatively coupled with a memory device 204. The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, etc.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a medium from which the processing device 202 can read instructions 206. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

The server 112 further includes a network interface 208 and input/output (I/O) components 210. Examples of the I/O components can include mice, keyboards, touchpads, displays (e.g., touch-screen displays), printers, etc. In some examples, the server 112 may also include additional storage.

Figure 3:
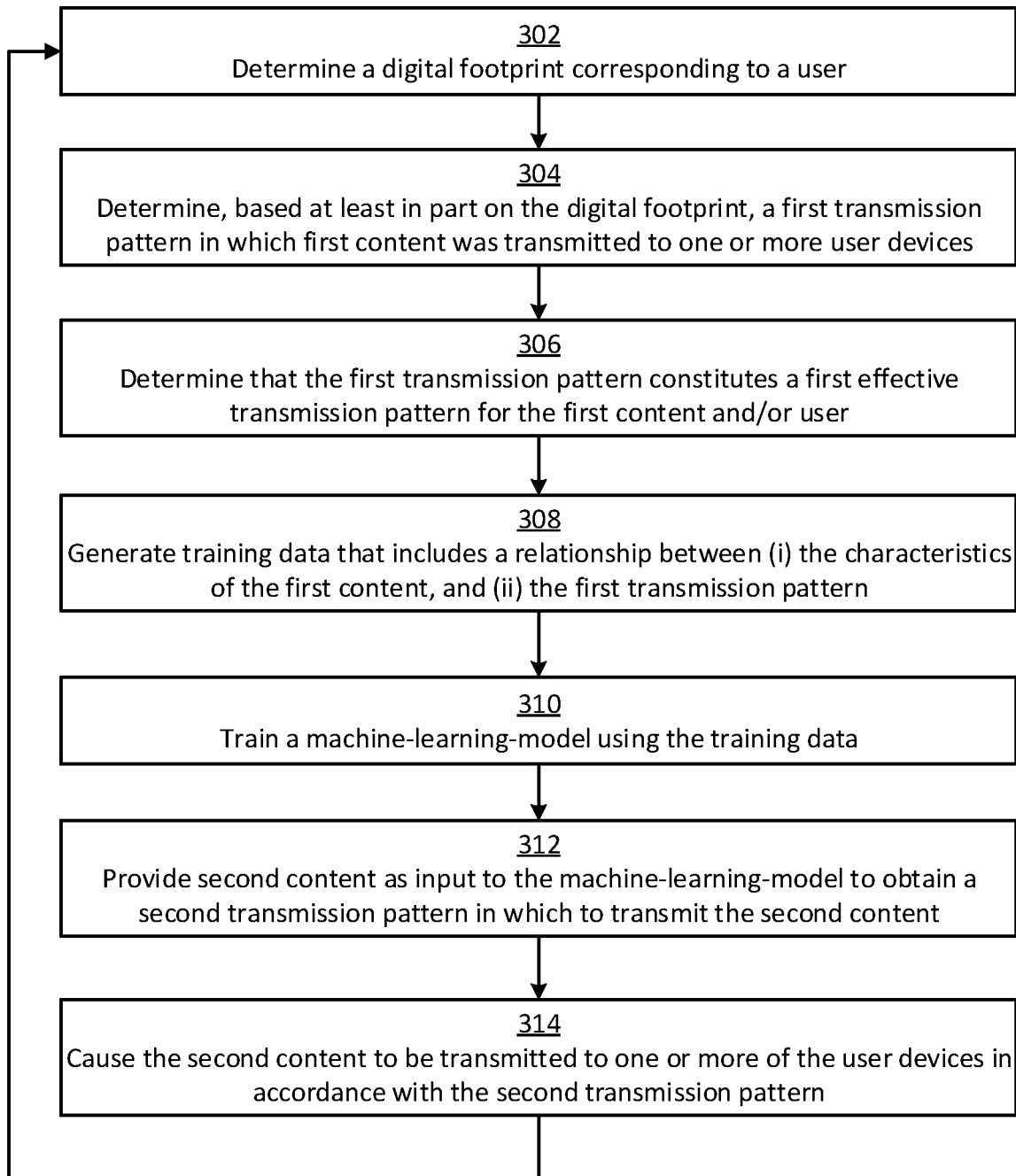
FIG. 3 is a flow chart of an example of a process for managing data transmissions based on a user's digital footprint according to some aspects.

Illustrative Methods for Managing Computing Resources Based on a User's Digital Footprint FIG. 3 is a flow chart of an example of a process for managing computing resources based on a user's digital footprint according to some aspects. Other examples can include more steps, fewer steps, or a different order of the steps shown in FIG. 3. The steps below are described with reference to the components of FIGS. 1-2 discussed above, but other implementations are possible.

In block 302, a processing device 202 determines a digital footprint 114 corresponding to a user 106. In some examples, determining the digital footprint 114 can involve generating the digital footprint 114 using information 108 from a database 110. The processing device 302 generates the digital footprint 114 by combining data trails left behind by user devices 102a-b associated with a user 106 into a single, combined digital footprint 114 for the user 106. In other examples, determining the digital footprint 114 can involve receiving the digital footprint 114 from a remote computing device.

In block 304, the processing device 202 determines a first transmission pattern at which first content was transmitted to any number and combination of the user devices 102a-b based at least in part on the digital footprint 114. For example, the processing device 202 can analyze the digital footprint 114 to identify each instance in which the first content was transmitted to the first user device 102a and derive a pattern therefrom. As another example, the processing device 202 can analyze the digital footprint 114 to identify each instance in which the first content was transmitted to a combination of user devices 102a-b and derive a pattern therefrom. Either way, the pattern can serve as the first transmission pattern.

In block 306, the processing device 202 determines that the first transmission pattern constitutes an effective transmission pattern related to the first content and/or the user 106. In some examples, the processing device 202 determines that the first transmission pattern constitutes the first effective transmission pattern if the first transmission pattern resulted in a second user device 102b performing a particular Internet activity corresponding to the first content.

As one particular example, the processing device 202 can analyze the digital footprint 114 and determine that, after the first content was transmitted in the first transmission pattern, the second user device 102b accessed a website or downloaded a file related to (e.g., specified in) the first content. As a result, the processing device 202 can determine that the first transmission pattern likely caused the user devices 102a-b to access the website or download the file, and thus that the first transmission pattern is an effective transmission pattern. As another example, the first content can be an ad associated with a food brand and the first user device 102a can be a smart refrigerator. In some such examples, the processing device 202 can analyze the digital footprint 114 to determine that, after the ad was transmitted in the first transmission pattern, the smart refrigerator reported to one of the servers 112a-c that a new food item associated with the brand was added to the refrigerator. As a result, the processing device 202 can determine that the first transmission pattern likely caused the user to purchase the food item, and thus that the first transmission pattern is an effective transmission pattern.

In block 308, the processing device 202 generates training data that includes a relationship between (i) one or more characteristics of the first content, and (ii) the first transmission pattern. For example, the processing device 202 can build a dataset that includes a relationship between a combination of keywords in the first content and the first transmission pattern (e.g., the number of times and/or frequency at which the first content was transmitted). The dataset can serve as the training data.

In some examples, the processing device 202 also incorporates other information into the training data, too. For example, the processing device 202 can determine a plurality of relationships between (i) other content delivered to other user devices associated with the same user 106 and/or other users, and (ii) other transmission patterns (e.g., effective transmission patterns) for the other content. The processing device 202 can then incorporate the other relationships into the training data. More robust training data can lead to more accurate machine-learning-models.

In block 310, the processing device 202 trains one or more machine-learning-models 120 using the training data. Training a machine-learning-model 120 can involve tuning weights for nodes in the machine-learning model in order to transform the machine-learning-model 120 from an untrained state into a trained state. Once trained, the machine-learning-model(s) 120 can receive an input (e.g., a piece of content or characteristics of a piece of content) and provide a transmission pattern as output.

In block 312, the processing device 202 provides second content as input into the one or more machine-learning-models 120. The second content may be different from the first content. In response, the machine-learning-model(s) 120 can output a second transmission pattern for transmitting the second content to one or more of the user devices 102a-b. The second transmission pattern can be an effective transmission pattern related to the second content.

In block 314, the processing device 202 causes the second content to be transmitted to any number and combination of the user devices 102a-b in accordance with the second transmission pattern. For example, the processing device 202 causes the second content to be transmitted to the first user devices 102a in accordance with the second transmission pattern.

In some examples, the processing device 202 transmits data comprising the second transmission pattern to one or more computing devices (e.g., servers 112b-c). This may result in a content-transmission schedule 122 associated with the second content being adjusted based on second transmission pattern. For example, this may result in the content-transmission schedule 122 being automatically adjusted to match the second transmission pattern.

In some examples, the processing device 202 also causes computing resources to be allocated based on the second transmission pattern. For example, the processing device 202 can transmit the second transmission pattern to the one or more computing devices, which can receive the second transmission pattern and responsively (e.g., automatically) allocate their computing resources based on the second transmission pattern. In this manner, the computing devices may be able to devote more computing resources to transmitting the second content at peak times in the second transmission pattern and less computing resources at other times, thereby freeing up the computing resources for performing other tasks.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A system comprising:
one or more processing devices; and
one or more memory devices that include instructions executable by the one or more processing devices for causing the one or more processing devices to:
 determine first content to be transmitted to a user;
 provide the first content as input to a trained machine-learning model, the trained machine-learning model being a machine-learning model that was previously trained using training data that includes a relationship between (i) a first transmission pattern including a schedule indicating when second content was previously transmitted to a user device of the user and (ii) one or more characteristics of the second content, wherein the first content is different from the second content;
 receive an output from the trained machine-learning model, wherein the output includes a second transmission pattern that is a schedule indicating when to transmit the first content to the user; and cause the first content to be transmitted to the user in accordance with the schedule in the second transmission pattern.

2. The system of claim 1, wherein the user device is a first user device, and wherein the schedule in the first transmission pattern describes a pattern in which the second content was transmitted to the first user device that resulted in the user performing an Internet activity associated with the second content using a second user device.

3. The system of claim 2, wherein the first user device is an Internet-connected television, and wherein the second user device is a mobile phone, tablet, laptop computer, desktop computer, e-reader, or a wearable computer.

4. The system of claim 2, wherein the Internet activity includes visiting a website.

5. The system of claim 1, wherein the schedule in the first transmission pattern includes multiple transmissions of the second content to the user device over the course of multiple days.

6. The system of claim 1, wherein the training data includes a plurality of transmission patterns indicating a plurality of schedules in which a plurality of content was transmitted to the user device during a prior time period, and wherein the plurality of transmission patterns resulted in the user performing a plurality of Internet activities corresponding to the plurality of content with one or more other user devices, the one or more other user devices being different from the user device.

7. The system of claim 1, wherein the first content is a first advertisement and the second content is a second advertisement.

8. The system of claim 1, wherein the one or more memory devices include instructions that are executable by the one or more processing devices for causing the one or more processing devices to cause the first content to be transmitted to the user in accordance with the second transmission pattern by transmitting the second transmission pattern to a server, the server being configured to update a content-transmission schedule for the first content based on the second transmission pattern.

9. A method comprising:
determining, by one or more processing devices, first content to be transmitted to a user;
providing, by the one or more processing devices, the first content as input to a trained machine-learning model, the trained machine-learning model being a machine-learning model that was previously trained using training data that includes a relationship between (i) a first transmission pattern including a schedule indicating when second content was previously transmitted to a user device of the user and (ii) one or more characteristics of the second content, wherein the first content is different from the second content;
receiving, by the one or more processing devices, an output from the trained machine-learning model, wherein the output includes a second transmission pattern that is a schedule indicating when to transmit the first content to the user; and
causing, by the one or more processing devices, the first content to be transmitted to the user in accordance with the schedule in the second transmission pattern.

10. The method of claim 9, wherein the user device is a first user device, and wherein the schedule in the first transmission pattern describes a pattern in which the second content was transmitted to the first user device that resulted in the user performing an Internet activity associated with the second content using a second user device.

11. The method of claim 10, wherein the first user device is an Internet-connected television, and wherein the second user device is a mobile phone, tablet, laptop computer, desktop computer, e-reader, or a wearable computer.

12. The method of claim 10, wherein the Internet activity includes visiting a website.

13. The method of claim 9, wherein the schedule in the first transmission pattern includes multiple transmissions of the second content to the user device over the course of multiple days.

14. The method of claim 9, wherein the training data includes a plurality of transmission patterns indicating a plurality of schedules in which a plurality of content was transmitted to the user device during a prior time period, and wherein the plurality of transmission patterns resulted in the user performing a plurality of Internet activities corresponding to the plurality of content with one or more other user devices, the one or more other user devices being different from the user device.

15. The method of claim 9, wherein the first content is a first advertisement and the second content is a second advertisement.

16. The method of claim 9, wherein causing the first content to be transmitted to the user in accordance with the second transmission pattern comprises transmitting the second transmission pattern to a server, the server being configured to update a content-transmission schedule for the first content based on the second transmission pattern.

17. A non-transitory computer-readable medium comprising program code that is executable by one or more processing devices for causing the one or more processing devices to:
provide first content as input to a trained machine-learning model, the trained machine-learning model being a machine-learning model that was previously trained using training data that includes a relationship between (i) a first transmission pattern indicating a number of times in which second content was previously transmitted to a user device of a user and (ii) one or more characteristics of the second content, wherein the first content is different from the second content;
receive an output from the trained machine-learning model, wherein the output includes a second transmission pattern indicating a number of times in which to transmit the first content to the user; and
cause the first content to be transmitted to the user in accordance with the second transmission pattern.

18. The non-transitory computer-readable medium of claim 17, wherein the user device is a first user device, and wherein the first transmission pattern is a schedule that describes a pattern in which the second content was transmitted to the first user device that resulted in the user performing an Internet activity associated with the second content using a second user device.

19. The non-transitory computer-readable medium of claim 18, wherein the first user device is an Internet-connected television, wherein the second user device is a mobile phone, tablet, laptop computer, desktop computer, e-reader, or a wearable computer, and wherein the Internet activity includes visiting a website.

20. The non-transitory computer-readable medium of claim 18, wherein the first transmission pattern includes dates of multiple transmissions of the second content to the user device over the course of multiple days.

21. The non-transitory computer-readable medium of claim 17, wherein the training data includes a plurality of transmission patterns indicating a plurality of schedules in which a plurality of content was transmitted to the user device during a prior time period, and wherein the plurality of transmission patterns resulted in the user performing a plurality of Internet activities corresponding to the plurality of content with one or more other user devices, the one or more other user devices being different from the user device.

22. The non-transitory computer-readable medium of claim 17, further comprising program code that is executable by the one or more processing devices for causing the one or more processing devices to cause the first content to be transmitted to the user in accordance with the second transmission pattern by transmitting the second transmission pattern to a server, the server being configured to update a content-transmission schedule for the first content based on the second transmission pattern.

* * * * *